Oliver Hyde. Imp^d. Tire for Wheels.

109907

PATENTED DEC 6 1870

Witnesses:
J. L. Boone
J. Fitzgerald

Inventor.
Oliver Hyde
by Dewey & Co
his Attorneys

United States Patent Office.

OLIVER HYDE, OF OAKLAND, CALIFORNIA.

Letters Patent No. 109,907, dated December 6, 1870.

IMPROVEMENT IN TIRES FOR TRACTION-ENGINES.

The Schedule referred to in these Letters Patent and making part of the same.

*To all whom it may concern:*

Be it known that I, OLIVER HYDE, of Oakland, county of Alameda, State of California, have invented an Improved Tire for the Driving-Wheels of Traction-Engines; and I do hereby declare the following description and accompanying drawing are sufficient to enable any person skilled in the art or science to which it most nearly appertains to make and use my said invention or improvement without further invention or experiment.

My invention relates to an improvement in rubber or elastic tires for the driving-wheels of traction engines.

The ordinary rubber tire is very expensive, on account of the trouble in molding and vulcanizing so large a mass of rubber at a time; and My invention consists in making the tire in sections of rubber or other elastic material, and bolting or otherwise fixing these sections upon the wheel, so as to form, practically, a continuous rubber tire at a small expense.

In order to explain my invention so that others will be able to fully understand the same, reference is had to the accompanying drawing forming a part of this specification, in which—

Figure 1:
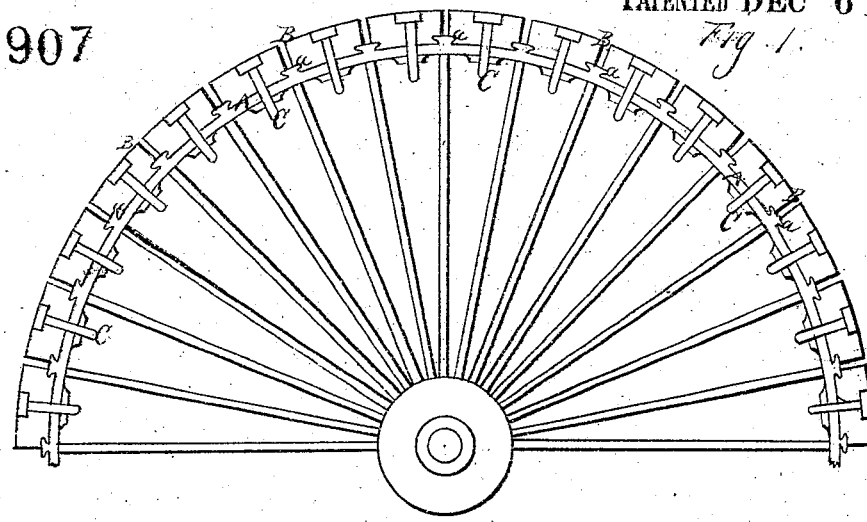
Figure 1 is a side view of a wheel provided with my sectional rubber tire.
Figure 2:
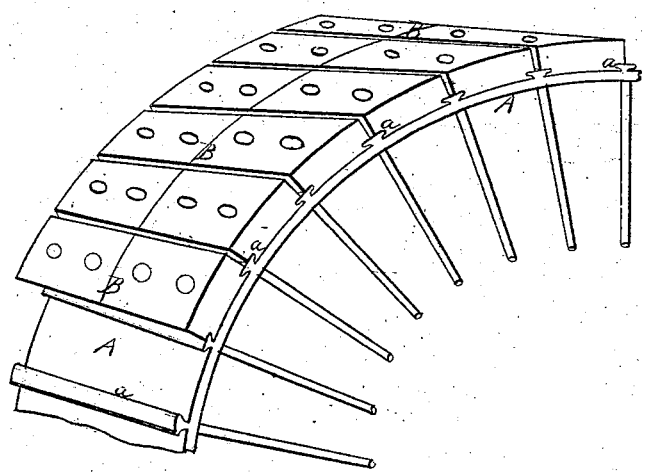
Figure 2 is a perspective view of a section of a wheel.
Figure 2:

A represents the metallic tire of any driving-wheel.

This tire is cast with T-shaped projections *a* at regular intervals around its entire circumference, which form ridges passing entirely across the face of the metallic tire.

B B are blocks or slabs of rubber, which may be of any desired or convenient size.

These blocks are molded or otherwise formed with a recess passing across each lower corner from side to side, of a proper shape to fit one-half of the T-shaped projection *a*, the block being slid into place from one edge of the tire A to the other.

The blocks B are also formed with holes through them, which are countersunk upon the outer face, through which, and also passing through the tire A, are placed large flat-headed bolts C.

The flat head of the bolt C will set down into the countersink of the holes on the outside of the tire, and thus be out of the way.

The lower ends of the bolts C are bifurcated and spread apart, so as to form a key, which prevents them from coming out, but yet allows the bolt to move in and out as the blocks are compressed and expanded by the movement of the wheel.

I do not confine myself to the precise method or devices herein mentioned for securing the blocks upon the tire A, as various devices may be substituted for them.

Washers might be used, which could extend from one block to the other in a countersink, and be confined at each end by bolts, rivets, or screws, or bands of sheet metal, or even some elastic band of sufficient strength might be employed for confining them in place, but the particular method of fixing the blocks in place is of very little importance, in view of the numerous devices which might be employed.

By this means I construct, at comparatively small expense, an elastic tire, which will have all the peculiar advantages and benefits claimed for rubber tires, with no expense for placing it upon the wheel, and should a portion of the tire be damaged or rendered useless by accident or otherwise, it will only be necessary to replace the damaged blocks with new ones, which can be readily done.

The difference in cost between my sectional rubber or elastic composition tire and the ordinary continuous rubber tire will be readily seen when the difference between the cost of molding and vulcanizing a large mass of rubber of the shape required and simply molding and vulcanizing the blocks is understood, while my tire will present many other advantages not claimed for the ordinary rubber tire.

Having thus described my invention,

What I claim, and desire to secure by Letters Patent, is—

1. An elastic tire for the wheels of traction-engines, when said tire is composed of elastic blocks B secured in succession around the tire A, substantially as and for the purpose above described.

2. The flat-headed bolt C with its lower end bifurcated and spread apart, so as to form a key, in combination with the countersunk holes in the blocks or equivalent device, substantially as and for the purpose above described.

3. The T-shaped projections *a* on the tire A, in combination with the corresponding grooves in the blocks B, or equivalent device, substantially as and for the purpose described.

In witness whereof I have hereunto set my hand and seal.

OLIVER HYDE. [L. S.]

Witnesses:
J. L. BOONE,
G. FITZGERALD.